United States Patent

Ann

(10) Patent No.: US 8,554,086 B2
(45) Date of Patent: Oct. 8, 2013

(54) METHOD FOR SETTING POWER CONTROL INITIAL VALUE USING INDICATION LIGHT IN VISIBLE LIGHT COMMUNICATIONS AND TRANSMISSION/RECEIVE APPARATUS USING THE SAME

(75) Inventor: Jong-Hoon Ann, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1316 days.

(21) Appl. No.: 11/969,941

(22) Filed: Jan. 7, 2008

(65) Prior Publication Data

US 2008/0166135 A1    Jul. 10, 2008

(30) Foreign Application Priority Data

Jan. 8, 2007 (KR) ........................ 10-2007-0002027

(51) Int. Cl.
    *H04B 10/04* (2011.01)
(52) U.S. Cl.
    USPC ........... 398/197; 398/162; 398/151; 398/137; 398/120; 398/38
(58) Field of Classification Search
    USPC ........... 398/156, 131, 129, 122, 9, 14, 15, 16, 398/25, 33, 38, 93, 94, 120, 137, 151, 162, 398/197
    See application file for complete search history.

(56) References Cited

U.S. PATENT DOCUMENTS

| 5,485,300 A | 1/1996 | Daley ........................... 359/180 |
| 6,554,428 B2 * | 4/2003 | Fergason et al. .............. 351/211 |
| 7,072,582 B2 * | 7/2006 | Stevens .......................... 398/38 |
| 7,142,786 B2 * | 11/2006 | Moursund et al. ............ 398/118 |
| 7,583,899 B2 * | 9/2009 | Sasai et al. .................... 398/131 |

FOREIGN PATENT DOCUMENTS

JP    09-069817    3/1997

\* cited by examiner

*Primary Examiner* — M. R. Sedighian
(74) *Attorney, Agent, or Firm* — Cha & Reiter, LLC

(57) ABSTRACT

Disclosed is a method for setting a power control initial value by using an indication light in visible light communications and a transmission/reception (Tx/Rx) apparatus using the method. The method includes the steps of: radiating multiple indication lights having power levels different from one another by a visible light communication transmitter; aligning a communication position simultaneously with measuring Received Signal Strength Indication (RSSI) of the indication light on detecting the indication light, selecting a power level whose RSSI is in a preset threshold range and which is adequate for transmission/receive among the multiple power levels different from one another, and informing the visible light communication transmitter of the adequate power level by a visible light communication receiver; and transmitting data from the visible light communication transmitter to the visible light communication receiver by using a transmitted power initial value according to a selected power level.

16 Claims, 6 Drawing Sheets

METHOD FOR SETTING POWER CONTROL INITIAL VALUE USING INDICATION LIGHT IN VISIBLE LIGHT COMMUNICATIONS AND TRANSMISSION/RECEIVE APPARATUS USING THE SAME

CLAIM OF PRIORITY

This application claims the benefit under 35 U.S.C. §119 (a) of an application entitled "Method for Setting Power Control Initial Value Using Indication Light in Visible Light Communications and Transmission/Receive Apparatus Using the Same", filed in the Korean Intellectual Property Office on Jan. 8, 2007 and assigned Serial No. 2007-2027, the entire contents of which are hereby incorporated by reference.

BACKGROUND OF THE INVENTION

1. Field of the Invention

The present invention relates to a method for setting a power control initial value by using an indication light in visible light communications and a transmission/reception (Tx/Rx) apparatus using the method. More particularly, the present invention relates to a method for setting a power control initial value of a visible light communication transmitter by using an indication light radiated from the visible light communication transmitter in order to align a position between the visible light communication transmitter and a visible light communication receivers and a transmission/receive apparatus using the method in a visible light communication system.

2. Description of the Related Art

Recently, as luminous efficiency of Light Emitting Diodes (LEDs) has been improved in, the LEDs are more commonly used not only in a special illumination market, such as handheld devices, displays, automobiles, traffic lights, advertising boards, etc., but also in the general illumination market, such as fluorescent lamps, incandescent electric lamps, etc. Especially, the luminous efficiency of LEDs has already surpassed that of incandescent electric lamps, and products superior to incandescent electric lamps are appearing in the marketplace. Also, as interest in optical wireless technology complementary to RF technology has lately increased because of an exhaustion of the frequencies in a Radio Frequency (RF) band, the possibility of false cross among wireless communications, an increase of the security requirement for communications, the advent of a very high-speed ubiquitous communication environment of fourth generation mobile communication (4G) wireless technology, etc., studies are being carried out on visible light wireless communications using visible light LEDs in many enterprises and research institutes, etc.

Communications for transmitting information by using visible light have merit such as a wide use band and the ability to be freely used without being subject to regulation. Also, the visible light communications have merit in that the reception range of information can be accurately sensed because a spot where light reaches or a direction in which the light moves can be seen. Accordingly, the visible light communications have reliability in an aspect of security, and also have merit such as the ability to be driven with low electric power in the aspect of power consumption.

As an example where visibility characteristics of visible light is applied, a scheme of aligning a transceiver by using an indication light can be cited. This scheme corresponds to a scheme where if the visible light communication transmitter radiates an indication light made up of a visible ray that can be seen before performing communications, a user visually checks the indication light, and controls the visible light communication transmitter or the visible light communication receiver so that light can accurately reach a light receiving unit of the visible light receiver. Since the application of the above scheme can cause a light divergence angle of the visible light communication transmitter to be acute, an advantage can be obtained in the aspect of power efficiency and security.

Subsequently, a description will be made of a configuration and an operation of a visible light communication apparatus using the scheme of aligning a transceiver by using indication light.

FIG. 1 is a block configuration diagram illustrating an example of a general visible light communication transceiver using an indication light. With reference to FIG. 1, a visible light communication transmitter 101 (hereinafter, referred to as "transmitter 101") includes an encoder 105, a modulator 107, a Direct Current (DC) supply 111, a controller 103, and a switch 109. Herein, the encoder 105 receives data to be transmitted, and performs channel coding on the received data. The modulator 107 modulates channel-coded information. The DC supply 111 generates an indication light necessary to align a position between the transmitter and a receiver at the very beginning of communication. The controller 103 controls operations of respective configuration elements of the transmitter 101. The switch 109 distinguishes between a period during which the indication light is generated and another period during which data is transmitted, and connects the modulator 107 or the DC supply 111 with a luminous clement under the control of the controller 103.

A visible light communication receiver 102 (hereinafter, referred to as a "receiver 102") includes a demodulator 108, a decoder 106, a received signal strength meter 110, and a controller 104. Herein, the demodulator 108 demodulates a received signal. The decoder 106 receives a demodulated signal, and performs channel decoding on the demodulated signal. The received signal strength meter 110 measures the strength of the received signal. The controller 104 controls operations of respective configuration elements of the receiver 102 during reception of data.

FIG. 2 is a flowchart illustrating a power control operation during transmission/reception of data in a general visible communications using an indication light. Referring to FIG. 2, the visible light communication apparatus begins to operate, and in step 210, the transmitter 101 enables the DC supply 111 to generate an indication light in order to align a position between the transmitter 101 and the receiver 102. In step 220, the indication light radiated from the DC supply 111 included in the transmitter 101 is checked by a user, and then a communication position between the transmitter 101 and the receiver 102 is aligned. If the position alignment between the transmitter 101 and the receiver 102 has been completed, the procedure moves to step 230, and the transmitter 101 begins to transmit data to the receiver 102. In step 240, the receiver 102 receives the data from the transmitter 101. In step 250, the receiver 102 measures the strength of the received signal by using the received signal strength meter 110. If the strength of the received signal is stronger than or weaker than a prescribed threshold range according to a result of the measurement, the procedure proceeds to step 260 to request the transmitter 101 to adjust the strength of an output signal thereof. In step 250, if the strength of the received signal is in the range of the prescribed threshold range, the strength of a current output signal is maintained. Thereafter, in step 270, it is determined whether Tx/Rx operations are completed. If it is determined in step 270 that the Tx/Rx operations are completed, the procedure goes to step 280 to complete the Tx/Rx operations. If it is determined in step 270 that the Tx/Rx operations are not completed, the procedure goes back to step 230 to repeat the performance of the Tx/Rx operations until the Tx/Rx operations are completed.

As described in the Tx/Rx operations of the visible light communication apparatus, in a case where the strength of a transmitted signal changes as variations occur in a distance between the transmitter and the receiver and in an environment thereof, the power control adjusts the strength in electric power of the transmitted signal from the transmitter according to feedback information of the receiver power control, and causes a signal received by the receiver to be maintained.

To examine, in the aspect of power control, the prior scheme where the position alignment is implemented by using the indication light, the transceiver initiates the power control after the transmitter has begun to transmit the signal following the completion of the position alignment using the indication light. Accordingly, so that the transmitter may reach an adequate output power level, the transmitter has to go through a process for regulating transmitted power several times. When the transmitter is in the process for regulating transmitted power, the receiver receives the signal having the strength stronger than or weaker than an adequate power level. In this case, problems occur in that electric power is excessively consumed until an adequate output power level is reached, or unstable reception of the signal is caused by the use of low electric power.

SUMMARY OF THE INVENTION

Accordingly, the present invention provides a method for setting an adequate power control initial value by using an indication light in a process for aligning a transceiver in a case where a position between a transmitter and a receiver is aligned by using the indication light and a transmission/receive apparatus using the method in a system using visible light communications.

In accordance with an embodiment of the present invention, there is provided a method for setting a power control initial value by using an indication light in visible light communications, including the steps of: radiating multiple indication lights having power levels different from one another by a visible light communication transmitter; aligning a communication position simultaneously with measuring Received Signal Strength Indication (RSSI) of the indication light on detecting the indication light, selecting a power level whose RSSI is in a preset threshold range and which is adequate for transmission/reception among the multiple power levels different from one another, and provision of information on a selected power level of the transmitter to the visible light communication transmitter which is considered to be an adequate power level by a visible light communication receiver; and transmission of data from the visible light communication transmitter to the visible light communication receiver by use of a transmitted power initial value according to the selected power level.

In accordance with another embodiment of the present invention, there is provided an apparatus using a method for setting a power control initial value by using an indication light in visible light communications, including: a visible light communication transmitter for generation of multiple indication lights having power levels different from one another in order to set a transmitted power initial value simultaneously with alignment of a position between a visible light communication transmitter and a visible light communication receiver at the very beginning of communication, and for transmission of data to the visible light communication receiver by use of the transmitted power initial value according to a selected power level selected by the visible light communication receiver; and a visible light communication receiver for alignment of a communication position simultaneously with measurement of Received Signal Strength Indication (RSSI) of the indication light on detection of the indication light transmitted from the visible light communication transmitter, for selection of a power level whose RSSI is in a preset threshold rage and which is adequate for transmission/receive among the multiple power levels different from one another, and for informing the visible light communication transmitter of the adequate power level by a visible light communication receiver.

BRIEF DESCRIPTION OF THE DRAWINGS

The above and other exemplary features and advantages of the present invention will be more apparent from the following detailed description taken in conjunction with the accompanying drawings, in which.

DETAILED DESCRIPTION OF THE PRESENT INVENTION

Hereinafter, exemplary embodiments of the present invention are described with reference to the accompanying drawings. The particulars, such as specific configuration elements, etc., are described in the following description, and are only provided in order to help more comprehensive understanding of the present invention. It will be obvious to those skilled in the art that predetermined changes in form or prescribed modifications may be made in these particulars within the spirit and scope of the invention. Also, in describing the present invention, a detailed description in regard of the art known to the public related to the present invention is omitted in a case where it is determined that the detailed description may unnecessarily make the subject matter of the present invention unclear.

Figure 1:
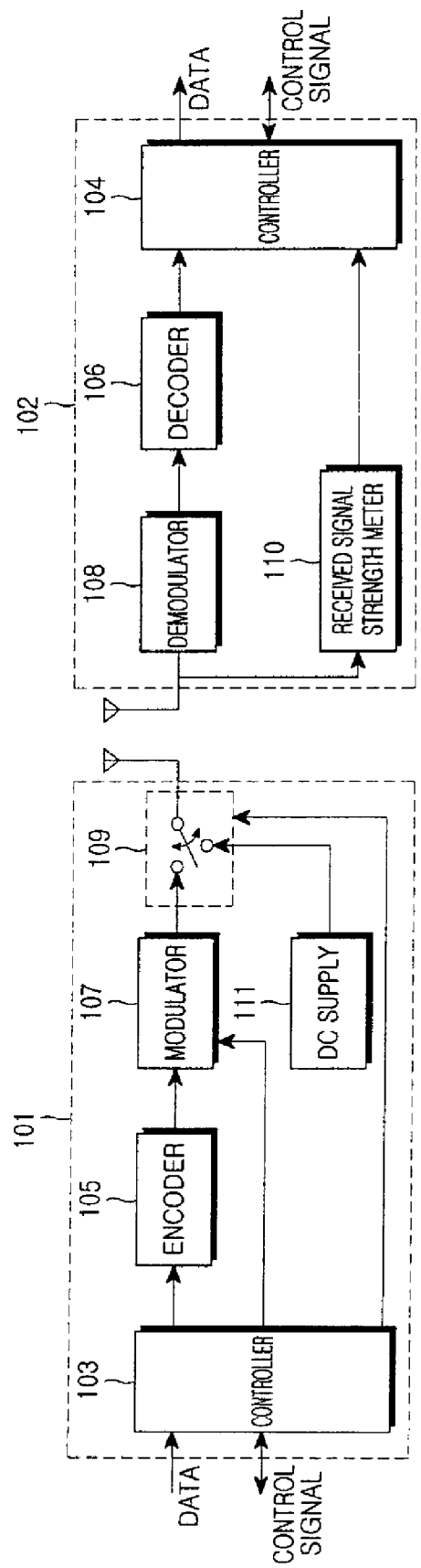
FIG. 1 is a block configuration diagram illustrating an example of a general visible light communication transceiver using indication light.
Figure 2:
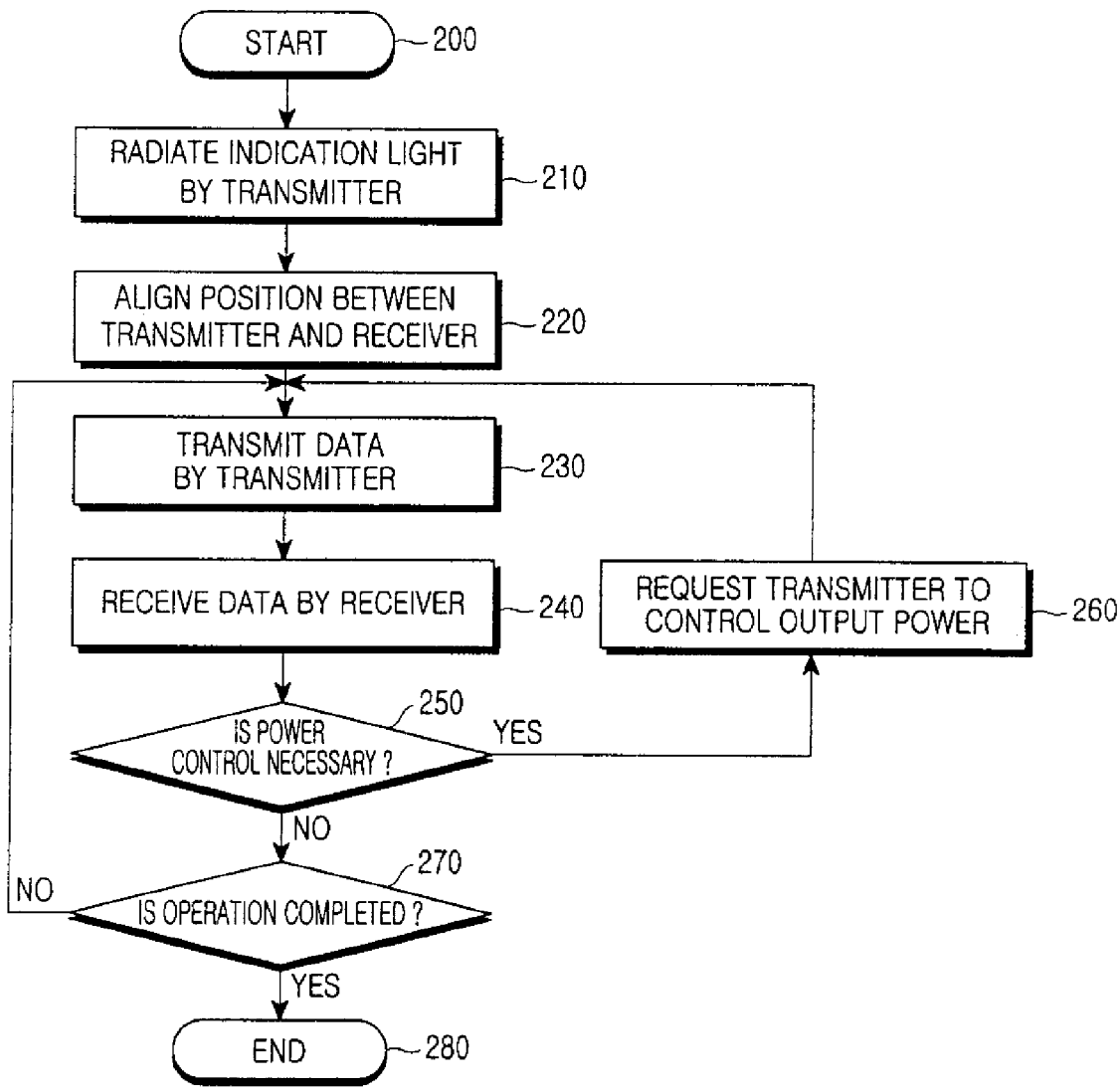
FIG. 2 is a flowchart illustrating a power control operation during transmission/reception of data in a general visible communications using indication light.
Figure 3:
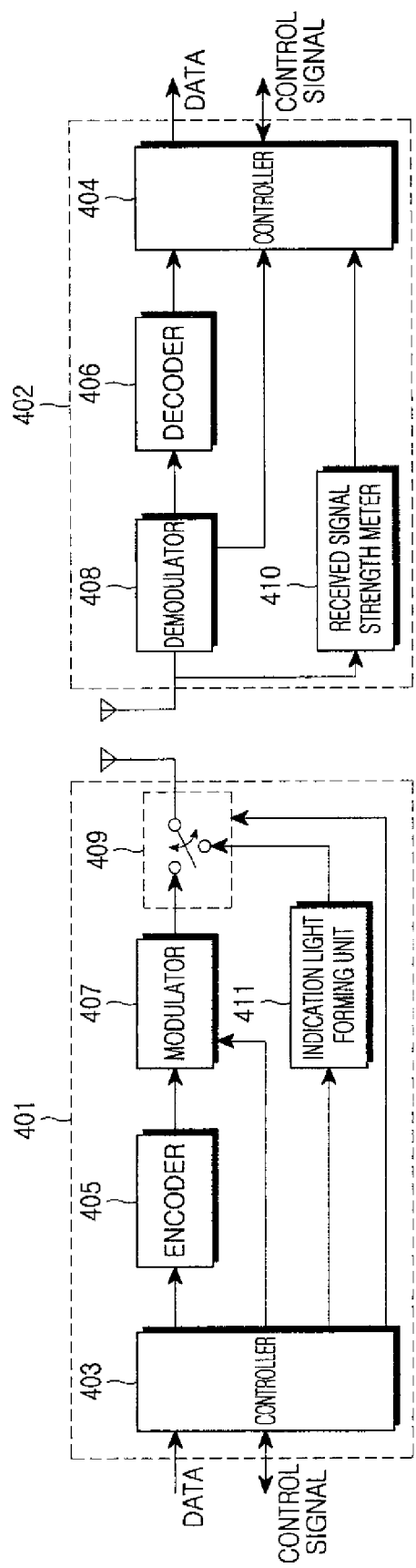
FIG. 3 is a block configuration diagram illustrating a visible light communication transceiver according to an embodiment of the present invention.

FIG. 3 is a block configuration diagram illustrating a visible light communication transceiver according to an embodiment of the present invention. A description is made of respective configuration elements of the visible light communication transceiver of the present invention as follows. A visible light communication transmitter 401 (hereinafter, referred to as a "transmitter 401") includes an encoder 405, a modulator 407, an indication light forming unit 411, a switch 409, and a controller 403. Herein, the encoder 405 receives data to be transmitted, and performs channel coding on the received data. The modulator 407 receives channel-coded data from the encoder 405, and modulates the received channel-coded data. The indication light forming unit 411 generates an indication light required to set a transmitted power initial value of the transmitter 401 simultaneously with aligning a position between the transmitter 401 and a visible light communication receiver at the very beginning of communications according to the present invention. The switch 409 connects the modulator 407 or the indication light forming unit 411 to a luminous element under the control of the controller 403. The controller 103 controls operations of respective configuration elements included in the transmitter 101, and controls the switch 409 by distinguishing between a period during which the indication light is generated and another period during which data is transmitted.

A visible light communication receiver 402 (hereinafter, referred to as a "receiver 402") includes a demodulator 408, a decoder 406, a received signal strength meter 410, and a controller 404. Herein, the demodulator 408 demodulates a received signal from the transmitter 401. The decoder 406 receives demodulated data from the demodulator 408, and performs channel decoding on the demodulated data. The received signal strength meter 410 measures the strength of the received signal. The controller 404 controls respective configuration elements of the receiver 402 during reception of data.

The indication light forming unit 411 included in the transmitter 401 generates the indication light having various power levels. The generated indication light is not only necessary to help a user to be able to implement transceiver alignment in the manner of the function of the prior DC supply, but it also has various power levels provided to the receiver 402 and also implying a group of candidate values so that the receiver 402 may measure RSSI of the various power levels, and then fix the most adequate transmitted power strength initial value which is in a preset threshold range.

Figure 4:
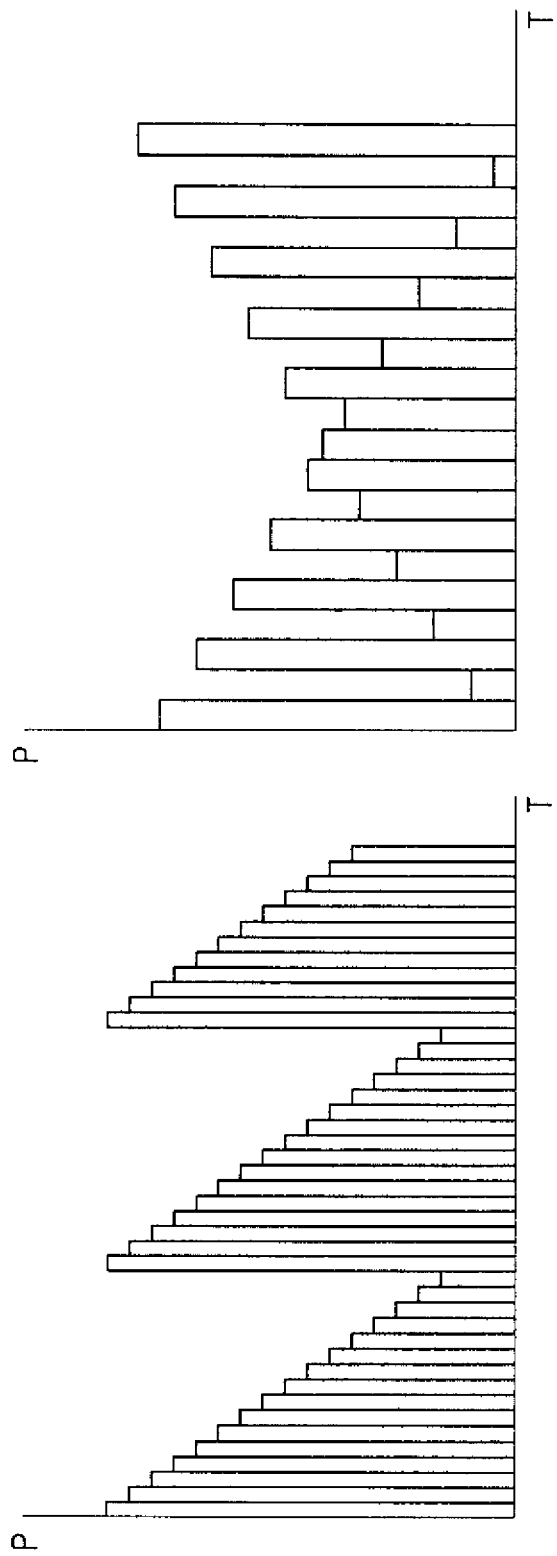
FIG. 4 is an exemplary view illustrating power levels according to length of time of indication light formed by an indication light forming unit.

FIG. 4 is an exemplary view illustrating power levels according to length of time of indication light formed by an indication light forming unit. FIG. 4 shows an example where the indication light forming unit generates an indication light having various power levels. A principle of the generation of an indication light is to provide various transmitted power levels. Accordingly, as illustrated in FIG. 4, if changes are sequentially applied to the power levels, it can cause the indication light to flicker, and therefore it can help a user to easily sense a spot that the indication light is lighting.

If there are multiple candidate values having power levels different from one another in the indication light, a method in which the respective candidate values can be classified must he provided. This is why, only if this demand is fulfilled, can the receiver select an adequate transmitted power level by measuring the strength of a signal corresponding to each candidate value included in the group of candidate values for a power control initial value, inform the transmitter of a selected transmitted power level value, and set an adequate power control initial value of the transmitter. There are various kinds of arts for classifying the candidate values according to power level, and several kinds of examples among the arts are as follows. First, in a case where information is not included in an indication light at all, a scheme of modulating a unique IDentification (ID) by giving the unique ID to each power level of the indication light and performing transmission is used. Namely, the modulation is executed on the unique ID given to each power level, and radiation to a receiver is performed on transmitted power of a power level conforming with a modulated unique ID. Another method is as follows. In the case of repeated transmission of sequences having an intention of synchronizing signals, such as Constant Amplitude Zero AutoCorrelation (CAZAC) codes through indication light, a method can be used in which, in a state of predetermination of patterns of transmitted power levels, after a receiver has received the indication light, a transmitter is informed of which candidate value a signal having an adequate transmitted power level corresponds to. Also, in a case where indication light transmitted from a transmitter increases and decreases in stages at a prescribed power difference, another method can be used in which, on receiving the indication light, a receiver informs a transmitter of which candidate value an adequate power control initial value corresponds to on the basis of a point in time of reception of the indication light.

Figure 5:
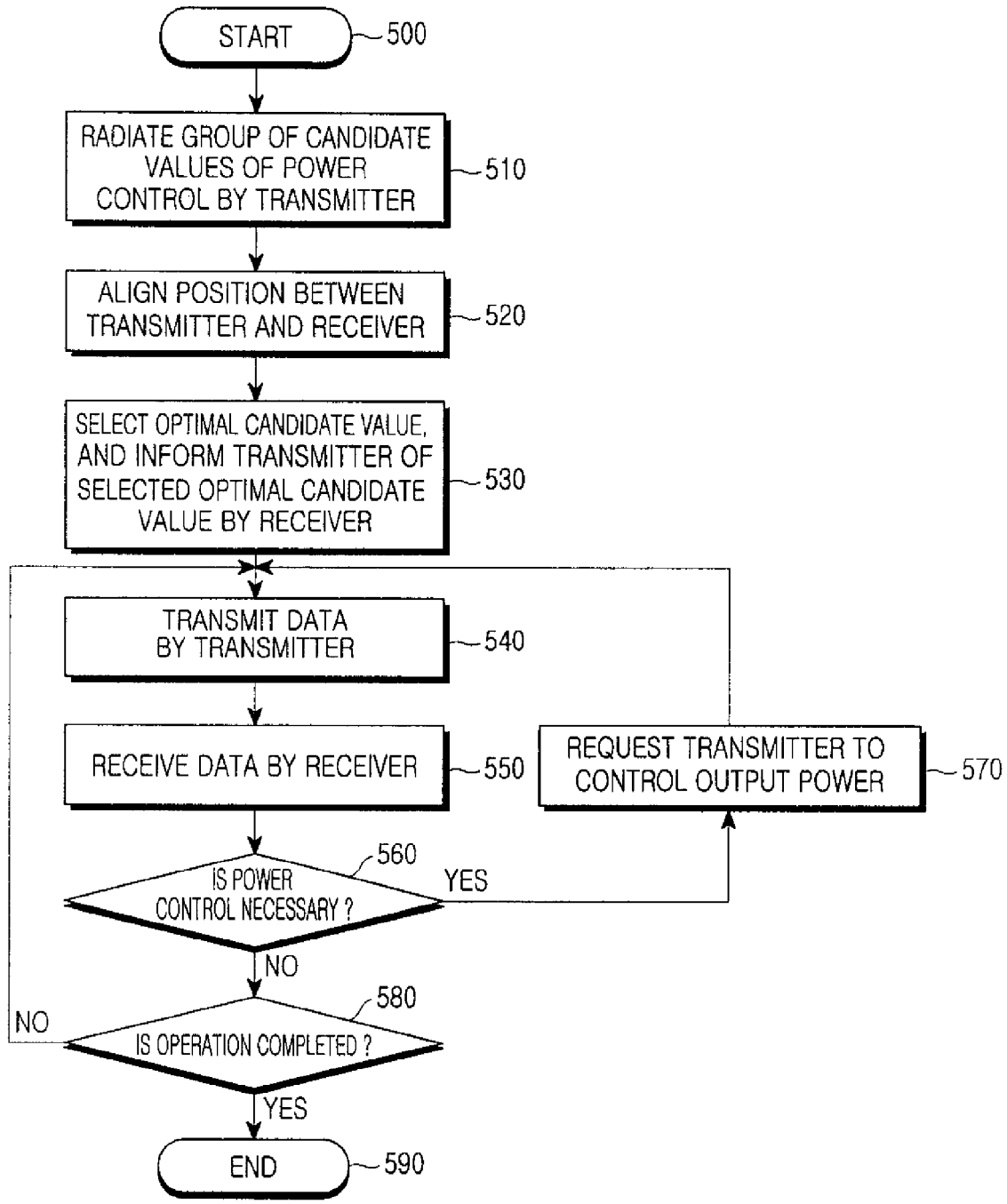
FIG. 5 is a flowchart illustrating a power control operation during transmission/reception of data in visible light communications according to an embodiment of the present invention.

FIG. 5 is a flowchart illustrating a power control operation during transmission/reception of data in visible light communications according to an embodiment of the present invention. With reference to FIG. 5, in step 500, a visible light communication apparatus initiates Tx/Rx operations, and in step 510, the transmitter 401 enables the indication light forming unit 411 to radiate an indication light including a group of candidate values for a transmitted power initial value. Then, in step 520, a user visually checks the indication light radiated from the indication light forming unit 411 included in the transmitter 401, and aligns a communication position between the transmitter 401 and the receiver 402. In step 530, the receiver 402 measures RSSI of the indication light radiated from the indication light forming unit 411 included in the transmitter 401, selects a candidate value for an adequate transmitted power initial value among the group of candidate values for the transmitted power initial value, and informs the transmitter 401 of the selected candidate value which becomes the first transmitted power of data transmitted from the transmitter 401 to the receiver 402. If the position alignment between the transmitter 401 and the receiver 402 has been completed and then if the initial value of power control has been fixed, the procedure proceeds to step 540 in which the transmitter 401 begins to transmit data to the receiver 402. In step 550, the receiver 402 receives the data from the transmitter 401. In step 560, the receiver 402 enables the received signal strength meter 410 to measure RSSI of a received signal, and if a measured RSSI is stronger or weaker than a prescribed threshold according to a result of the measured RSSI, the procedure proceeds to step 570 in which the receiver 402 requests the transmitter 401 to adjust the strength of an output signal. If the RSSI of the received signal is in a prescribed threshold range in the above step 560, the strength of a current output signal is maintained. Thereafter, in step 580, it is determined whether Tx/Rx operations are completed. If it is determined in step 580 that the Tx/Rx operations are completed, the procedure proceeds to step 590 to complete the Tx/Rx operations. If it is determined in step 580 that the Tx/Rx operations are not completed, the procedure goes back to step 540 to perform the Tx/Rx operations until the Tx/Rx operations are completed.

Figure 6:
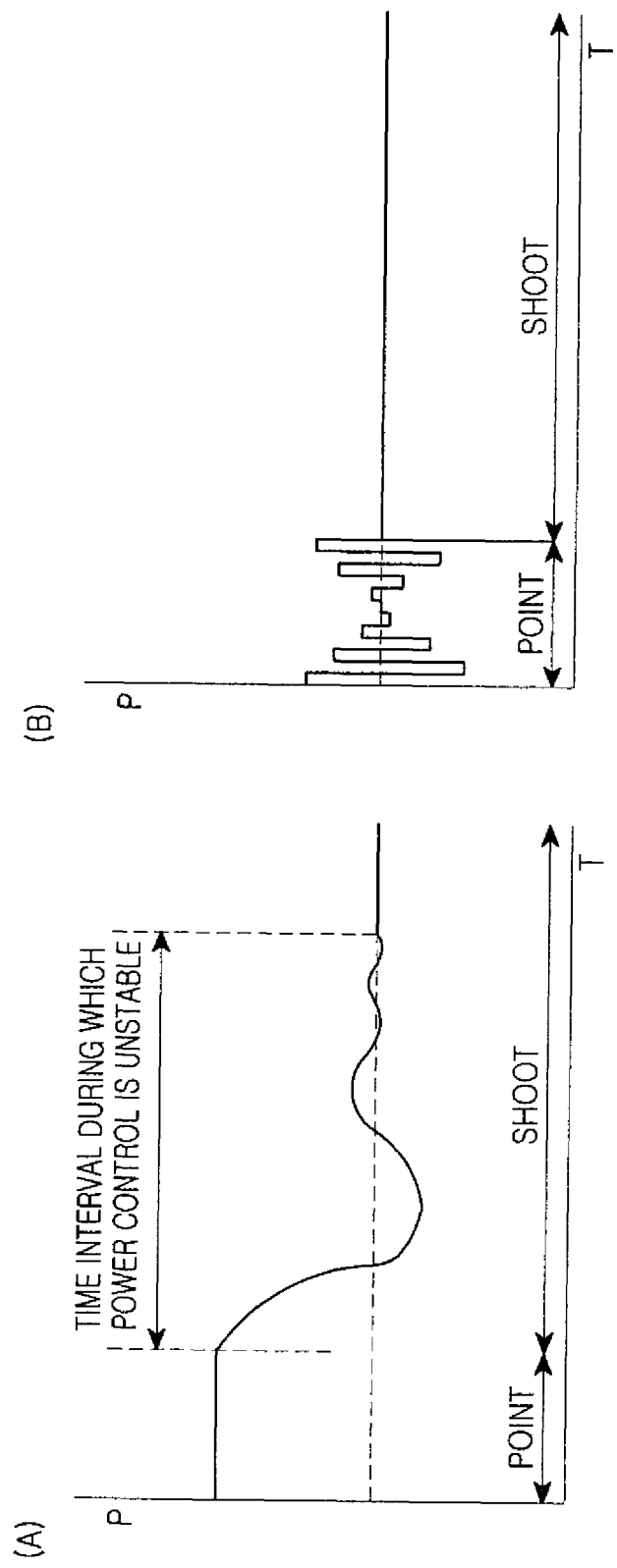
FIG. 6 is a view illustrating a power control learning curve in the initial stage of communications of a visible light communication apparatus according to an embodiment of the present invention.

FIG. 6 is a view illustrating a power control learning curve in the initial stage of communications of a visible light communication apparatus according to an embodiment of the present invention. As illustrated in FIG. 6, let a period during which an operation for aligning a position between the transmitter and the receiver is performed be defined as a point period, and after the position alignment operation has been finished, let another period during which communication is performed between the transmitter and the receiver following radiation of the indication light of the transmitter be defined as a shoot period. (A) illustrated in FIG. 6 shows a power control learning curve in the initial stage of communications of the prior visible light communication apparatus. As shown in (A) of FIG. 6, because the prior visible light communication apparatus initiates power control during the shoot period after performing a position alignment operation during the point period, there exists a time interval during which transmitted power is unstable due to a feedback operation between a transmitter and a receiver, and therefore, it takes time until a stable power control is attained.

(B) illustrated in FIG. 6 shows a learning curve depicting power control in the initial stage of communications of a visible light communication apparatus according to an embodiment of the present invention. As shown in (B) of FIG. 6, the visible light communication apparatus according to an embodiment of the present invention radiates an indication light having various power levels in order to fix a power control initial value of the transmitter 401 simultaneously with performing the position alignment operation of the transceiver following radiation of an indication light during the point period. The receiver 402 selects the most adequate power level for Tx/Rx among the various power levels, informs information on a selected power level of the transmitter 401, and then an initial value of transmitted power of the transmitter 401 can be set. Since the transmitter 401 that has set the initial value of transmitted power thereof in this manner transmits a visible light signal by using the initial value of the power fixed during the shoot period, without a time interval in the initial stage of communications during which the power control is unstable, the transmitter 401 can immediately keep transmitted power stable with the start of communications.

The merits and effects of exemplary embodiments, as disclosed in the present invention, and as so configured to operate as described above, are described as follows.

As described above, a method and an apparatus for setting a power control initial value by using an indication light in visible light communications according to the present invention can reduce a time interval in the initial stage of communications during which the power control is unstable, and causing an indication light to flicker can help a user to easily sense the indication light, and to easily find a spot that the indication light is lighting.

As described above, a configuration and an operation can be accomplished of a method for setting a power control initial value by using an indication light in visible light communications and a transmission/reception apparatus using the method according to an embodiment of the present invention. While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for setting a power control initial value by using an indication light in visible light communications, the method comprising the steps of:
radiating a plurality of indication lights as candidate values to a visible light receiver, each one of the plurality of indication lights having a power level different from the others by a visible light communication transmitter;
receiving a particular candidate value having an adequate power level by the visible light communication receiver; and
transmitting data to the visible light communication receiver by using a transmitted power initial value according to the received adequate power level; and
wherein the visible light communication transmitter radiates the plurality of indication lights in the form of an increase and a decrease, the plurality of indication light for measuring the respective power levels of each of the indication lights by the visible light communication receiver.

2. The method as claimed in claim 1, further comprising the step of sequentially applying changes to the power level of the indication light radiated from the visible light communication transmitter, wherein the indication light is caused to flicker.

3. The method as claimed in claim 1, further comprising a step of the visible light communication transmitter transmitting sequences of synchronizing signals, including Constant Amplitude Zero AutoCorrelation (CAZAC) codes, transmitted via the plurality indication lights in order to classify the respective power levels of the plurality of indication lights radiated from the visible light communication transmitter.

4. The method as claimed in claim 1, wherein the particular candidate value is selected by the received plurality of indication lights.

5. A method for setting a power control initial value by using an indication light in visible light communications, the method comprising the steps of:
radiating a plurality of indication lights as candidate values, each having a power level different from the others by a visible light communication transmitter;
receiving a particular candidate value having a adequate power level from a visible light communication receiver;
transmitting data from the visible light communication transmitter to the visible light communication receiver by using a transmitted power initial value according to the received adequate power level; and
classifying the respective power levels of the indication light radiated from the visible light communication transmitter by the visible light communication transmitter performing the steps of:
associating a unique IDentification (ID) with each power level of the indication light;
modulating the unique ID; and
transmitting the modulated unique ID.

6. An apparatus using a method for setting a power control initial value by using an indication light in visible light communications, the apparatus comprising:
a visible light communication transmitter for generation of a plurality of indication lights as candidate values to a visible light communication receiver each having a power level different from the others whereby a transmitted power initial value is set simultaneously with alignment of a position between the visible light communication transmitter and a visible light communication receiver at the very beginning of communication, and for transmission of data to the visible light communication receiver by using the transmitted power initial value according to a receiving of a particular candidate value having an adequate power level from the visible light communication receiver; and
wherein the visible light communication transmitter radiates the plurality of indication lights in the form of an increase and a decrease, the plurality of indication light for measuring the respective power levels of each of the indication lights by the visible light communication receiver.

7. The apparatus as claimed in claim 6, wherein the visible light communication transmitter further comprises configuration elements:
   an encoder for performance of channel coding on data to be transmitted;
   a modulator for reception of channel-coded data from the encoder, and for modulation of the received channel-coded data;
   an indication light-forming unit for generation of an indication light having various power levels in order to set a transmitted power initial value simultaneously with alignment of a position between the visible light communication transmitter and the visible light communication receiver; and
   a controller for control of respective configuration elements of the visible light communication transmitter during transmission of data.

8. A method for setting a power control initial value of a visible light receiver by using an indication light in visible light communications, the method comprising the steps of:
   receiving a plurality of indication lights as candidate values, by the visible light receiver, each one of the plurality of indication lights having a power level different from the others;
   on detecting, by the visible light communication receiver, at least one indication light of the plurality of indication lights, determining whether a communication position has been aligned while simultaneously measuring a Received Signal Strength Indication (RSSI) of the at least one detected indication light;
   selecting a power level as a particular candidate value whose measured RSSI is in a preset threshold range and which is determined to be adequate for transmission/reception among the multiple power levels different from one another by a visible light communication receiver;
   informing a visible light communication transmitter of a particular candidate value having the determined adequate power level;
   receiving data from the visible light communication transmitter by using a transmitted power initial value according to the particular candidate value having the determined adequate power level; and
   wherein a plurality of indication lights are radiated in the form of an increase and a decrease from the visible light communication transmitter, the plurality of indication lights for measuring the respective power levels of each of the indication lights by the visible light communication receiver.

9. The method as claimed in claim 8, wherein the indication light transmitted from the visible light communication transmitter flickers by sequentially applying changes to the power level of the indication light by the visible light communication transmitter.

10. The method as claimed in claim 8, wherein the indication light transmitted from the visible light communication transmitter is modulated a unique ID associated with each power level of the indication light.

11. The method as claimed in claim 8, wherein the indication light transmitted from the visible light communication transmitter is sequences of codes in order to classify the power level of the indication light radiated from the visible light communication transmitter.

12. An apparatus using a method for setting a power control initial value by using an indication light in visible light communications, the apparatus comprising:
   a visible light communication receiver for alignment of a communication position simultaneously with measurement of Received Signal Strength Indication (RSSI) of the indication light on detection of the indication light transmitted from a visible light communication transmitter, for selection of a power level whose RSSI is in a preset threshold range and which is adequate for transmission/reception among the plurality of power levels different from each other, and for provision of information on a particular candidate value having the adequate power level of the visible light communication transmitter;
   wherein a plurality of indication lights are radiated in the form of an increase and a decrease from the visible light communication transmitter, the plurality of indication lights for measuring the respective power levels of each of the indication lights by the visible light communication receiver.

13. The apparatus as claimed in claim 12, wherein the visible light communication receiver further comprises configuration elements:
   a demodulator for demodulation of a received signal from the visible light communication transmitter;
   a decoder for reception of the demodulated data from the demodulator, and for performance of channel decoding on the demodulated data;
   a received signal strength measuring unit for measurement of the strength of the received signal; and
   a controller for control of respective configuration elements of the visible light communication receiver during reception of data.

14. The apparatus as claimed in claim 12, wherein the indication light transmitted from the visible light communication transmitter flickers by sequentially applying changes to the power level of the indication light by the visible light communication transmitter.

15. The apparatus as claimed in claim 12, wherein the indication light transmitted from the visible light communication transmitter is modulated a unique ID associated with each power level of the indication light.

16. The apparatus as claimed in claim 12, wherein the indication light transmitted from the visible light communication transmitter is sequences of synchronizing signals, including Constant Amplitude Zero AutoCorrelation (CAZAC) codes in order to classify the power level of the indication light radiated from the visible light communication transmitter.

* * * * *

UNITED STATES PATENT AND TRADEMARK OFFICE
CERTIFICATE OF CORRECTION

| | | |
|---|---|---|
| PATENT NO. | : 8,554,086 B2 | Page 1 of 1 |
| APPLICATION NO. | : 11/969941 | |
| DATED | : October 8, 2013 | |
| INVENTOR(S) | : Jong-Hoon Ann | |

It is certified that error appears in the above-identified patent and that said Letters Patent is hereby corrected as shown below:

In the Claims

Column 8, Claim 5, Line 33 should read as follows:
--...value having an adequate...--

Signed and Sealed this
Third Day of December, 2013

Margaret A. Focarino
*Commissioner for Patents of the United States Patent and Trademark Office*